United States Patent
Otsuka (10) Patent No.: US 11,440,594 B2
(45) Date of Patent: Sep. 13, 2022

(54) FRONT PILLAR OUTER

(71) Applicant: NIPPON STEEL CORPORATION, Tokyo (JP)

(72) Inventor: Kenichiro Otsuka, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 92 days.

(21) Appl. No.: 16/961,568

(22) PCT Filed: Jan. 11, 2019

(86) PCT No.: PCT/JP2019/000794
§ 371 (c)(1),
(2) Date: Jul. 10, 2020

(87) PCT Pub. No.: WO2019/139151
PCT Pub. Date: Jul. 18, 2019

(65) Prior Publication Data
US 2021/0061362 A1  Mar. 4, 2021

(30) Foreign Application Priority Data
Jan. 12, 2018 (JP) .............................. JP2018-003844

(51) Int. Cl.
*B62D 25/04* (2006.01)
*B62D 27/02* (2006.01)
*B62D 27/06* (2006.01)

(52) U.S. Cl.
CPC ............. *B62D 25/04* (2013.01); *B62D 27/02* (2013.01); *B62D 27/026* (2013.01); *B62D 27/06* (2013.01)

(58) Field of Classification Search
CPC ....... B62D 25/04; B62D 27/02; B62D 27/023
(Continued)

(56) References Cited

U.S. PATENT DOCUMENTS 9,884,652 B2 * 2/2018 Elfwing ................. B62D 25/04
2017/0106917 A1 4/2017 Mashio et al.

FOREIGN PATENT DOCUMENTS

EP  3 085 605 A1  10/2016
JP  5-310147 A   11/1993
(Continued)

OTHER PUBLICATIONS

International Search Report for PCT/JP2019/000794 (PCT/ISA/210) dated Feb. 26, 2019.
(Continued)

*Primary Examiner* — Dennis H Pedder
(74) *Attorney, Agent, or Firm* — Birch, Stewart, Kolasch & Birch, LLP (57) ABSTRACT

A front pillar outer includes a first member and a second member. The first member includes a first glass-surface-side flange part and a first door-side flange part. The sheet thickness of the second member is thinner than the sheet thickness of the first member. The second member includes a second glass-surface-side flange part and a second door-side flange part. The first door-side flange part protrudes further towards the rear end of the front pillar outer than the first glass-surface-side flange part and a first main body part, and overlaps with the second door-side flange part. The second glass-surface-side flange part overlaps with a rearward region of the first glass-surface-side flange part. A second main body part overlaps with a rearward region of the first main body part. In a region in which the first member overlaps with the second member, the first member is joined to the second member.

9 Claims, 6 Drawing Sheets (58) Field of Classification Search
USPC .................................................. 296/193.06
See application file for complete search history.

(56) References Cited

FOREIGN PATENT DOCUMENTS

| JP | 2002-249069 A | 9/2002 |
| JP | 2014-118009 A | 6/2014 |
| JP | 2016-2781 A | 1/2016 |

OTHER PUBLICATIONS

Written Opinion of the International Searching Authority for PCT/JP2019/000794 (PCT/ISA/237) dated Feb. 26, 2019.

* cited by examiner

FRONT PILLAR OUTER

TECHNICAL FIELD

The present invention relates to a front pillar outer that constitutes one part of a front pillar.

BACKGROUND ART

A front pillar of an automobile is formed by combining a front pillar inner and a front pillar outer and the like. From the viewpoint of improving the fuel economy of an automobile, it is desirable that the front pillars constituting the vehicle body are light in weight. On the other hand, from the viewpoint of improving the collision safety of the vehicle body, it is desirable that the front pillars have high strength. In other words, there is a demand to both reduce the weight and increase the strength of a front pillar.

Vehicle body components whose strength is enhanced are disclosed, for example, in Japanese Patent Application Publication No. 2014-118009 (Patent Literature 1), Japanese Patent Application Publication No. 5-310147 (Patent Literature 2) and Japanese Patent Application Publication No. 2016-2781 (Patent Literature 3).

In Patent Literature 1, a front pillar lower that includes a reinforcing component is disclosed. The reinforcing component disclosed in Patent Literature 1 includes a vertical face portion which faces a front wheel, and a high-strength lateral face portion. If a vehicle is involved in a head-on collision, the front wheels move in the rearward direction of the vehicle. The vertical face portion restricts movement of the front wheels in the rearward direction of the vehicle. The lateral face portion absorbs collision energy that is applied to the vertical face portion. It is disclosed in Patent Literature 1 that, by this means, deformation of the front pillar lower due to a collision can be suppressed.

A vehicle body component disclosed in Patent Literature 2 includes a first structure having a closed cross-section, and a second structure that has a closed cross-section and which is welded to the first structure. Therefore, the vehicle body component includes a region constituted by only the first structure, and a region constituted by the first structure and the second structure. In other words, the vehicle body component includes two regions of different sheet thicknesses. It is disclosed in Patent Literature 2 that, by this means, the capacity of the vehicle body component to absorb collision energy is increased.

A vehicle body component disclosed in Patent Literature 3 includes a U-shaped first component, and a U-shaped second component. A slit is provided in an end part of the first component and an end part of the second component, respectively. The slit of the first component and the slit of the second component overlap and are welded to each other. Therefore, because the two components overlap at one portion of the vehicle body component, the strength increases. It is disclosed in Patent Literature 3 that, by this means, the vehicle body component has high strength, even without being equipped with a separate member such as a reinforcing sheet.

Apart from the components disclosed in Patent Literatures 1 to 3, it is conceivable to adopt a tailored welded blank (hereunder, referred to as a "TWB") or a tailored rolled blank (hereunder, referred to as a "TRB") as the material of a front pillar to satisfy the need for both a reduction in the weight of a vehicle body and an increase in the strength of the vehicle body. Furthermore, it is conceivable to attach a reinforcing sheet to one portion of the front pillar.

A TWB is a material formed by combining and welding together metal sheets of different material quality or sheet thicknesses. A component that is produced using a TWB has partially different sheet thicknesses or partially different strengths, or both partially different sheet thicknesses and partially different strengths.

A TRB is a material in which the sheet thickness continuously changes. A component that is produced using a TRB has partially different sheet thicknesses or partially different strengths, or both partially different sheet thicknesses and partially different strengths.

CITATION LIST

Patent Literature

Patent Literature 1: Japanese Patent Application Publication No. 2014-118009
Patent Literature 2: Japanese Patent Application Publication No. 5-310147
Patent Literature 3: Japanese Patent Application Publication No. 2016-2781

SUMMARY OF INVENTION

Technical Problem

However, the front pillar lower disclosed in Patent Literature 1 includes the reinforcing component that is a separate member. The vehicle body component disclosed in Patent Literature 2 includes the second structure that is welded to the first structure along the longitudinal direction of the first structure. In the vehicle body component disclosed in Patent Literature 3, the first component is welded to the second component across the entire cross-section of a weld zone between the first component and the second component. Accordingly, the weight of the respective vehicle body components disclosed in Patent Literatures 1 to 3 is heavy.

Further, in general, a TWB is composed of two different metal sheets. Therefore, a TWB only has two strength regions. The same applies with respect to a component that is reinforced by a reinforcing sheet. The production cost of a TRB is high. In addition, when producing a long component such as a front pillar outer by using a TWB, a TRB or a reinforcing sheet, it is difficult to provide different strength regions in a direction (width direction) orthogonal to the longitudinal direction.

An objective of the present invention is to provide a front pillar outer that is lightweight and high-strength.

Solution to Problem

A front pillar outer according to the present embodiment includes a glass-surface-side flange part, a door-side flange part, and a main body part which connects the glass-surface-side flange part and the door-side flange part. The front pillar outer has a first member and a second member. The first member extends from a fore end towards a rear end of the front pillar outer. The first member includes a first glass-surface-side flange part which constitutes one part of the glass-surface-side flange part, a first door-side flange part which constitutes one part of the door-side flange part, and a first main body part which connects the first glass-surface-side flange part and the first door-side flange part. The second member extends from the rear end towards the fore end of the front pillar outer, and has a thinner sheet thickness than the first member. The second member includes a second glass-surface-side flange part which constitutes one part of the glass-surface-side flange part, a second door-side flange part which constitutes one part of the door-side flange part, and a second main body part which connects the second glass-surface-side flange part and the second door-side flange part. The first door-side flange part protrudes further towards the rear end of the front pillar outer than the first glass-surface-side flange part and the first main body part, and overlaps with the second door-side flange part. The second glass-surface-side flange part overlaps with a rearward region of the first glass-surface-side flange part. The second main body part overlaps with a rearward region of the first main body part. The first member is joined to the second member in a region at which the first door-side flange part overlaps with the second door-side flange part, in a region at which the second glass-surface-side flange part overlaps with the first glass-surface-side flange part, and in a region at which the second main body part overlaps with the first main body part.

Advantageous Effects of Invention

A front pillar outer according to the present invention is lightweight and high-strength.

DESCRIPTION OF EMBODIMENT

A front pillar outer according to the present embodiment includes a glass-surface-side flange part, a door-side flange part, and a main body part which connects the glass-surface-side flange part and the door-side flange part. The front pillar outer has a first member and a second member. The first member extends from a fore end towards a rear end of the front pillar outer. The first member includes a first glass-surface-side flange part which constitutes one part of the glass-surface-side flange part, a first door-side flange part which constitutes one part of the door-side flange part, and a first main body part which connects the first glass-surface-side flange part and the first door-side flange part. The second member extends from the rear end towards the fore end of the front pillar outer, and has a thinner sheet thickness than the first member. The second member includes a second glass-surface-side flange part which constitutes one part of the glass-surface-side flange part, a second door-side flange part which constitutes one part of the door-side flange part, and a second main body part which connects the second glass-surface-side flange part and the second door-side flange part. The first door-side flange part protrudes further towards the rear end of the front pillar outer than the first glass-surface-side flange part and the first main body part, and overlaps with the second door-side flange part. The second glass-surface-side flange part overlaps with a rearward region of the first glass-surface-side flange part. The second main body part overlaps with a rearward region of the first main body part. The first member is joined to the second member in a region at which the first door-side flange part overlaps with the second door-side flange part, in a region at which the second glass-surface-side flange part overlaps with the first glass-surface-side flange part, and in a region at which the second main body part overlaps with the first main body part.

If a collision load is applied to the front pillar outer, the front pillar outer will bend. When the front pillar outer bends, compressive stress is applied to the door-side flange part and tensile stress is applied to the glass-surface-side flange part. In the front pillar outer of the present embodiment, the first member overlaps with and is joined to the second member in a region where compressive stress is applied. By this means, the strength of the front pillar outer increases. This is because the buckling resistance strength of the region at which compressive stress is applied is influenced by the product of the material strength to the first power and the sheet thickness to the third power, and consequently the sheet thickness becomes thicker by superimposing the materials and the buckling resistance strength increases significantly. In a region where tensile stress is applied, the front pillar outer is constituted by only the second member which has a thinner sheet thickness than the first member. By this means, the weight of the front pillar outer is lightened. This is because the strength at the region where the tensile stress is applied is influenced by the product of the material strength to the first power and the sheet thickness to the first power. In other words, the buckling resistance strength at the compressed region improves significantly by making the sheet thickness (total sheet thickness at the superimposed part) thicker rather than by increasing the material strength. On the other hand, at a region where the tensile stress is applied, because the degrees of influence of the material strength and the sheet thickness are approximately equal, from the viewpoint of reducing weight, it is better to increase the material strength rather than to make the sheet thickness thicker. At a front part of the front pillar outer, the first member which has a thicker sheet thickness than the second member is present to constitute the front pillar outer. Thus, the strength of the front part of the front pillar outer is high. In short, the front pillar outer of the present embodiment includes three strength regions. The three strength regions are respectively provided at appropriate regions in the longitudinal direction and the width direction of the front pillar outer. By this means, the weight of the front pillar outer is reduced and the strength of the front pillar outer increases.

In the aforementioned front pillar outer, when the length of the glass-surface-side flange part is represented by "L", preferably a region where the first door-side flange part overlaps with the second door-side flange part is provided in at least one part of or over all of a range of $L \times \frac{2}{3}$ from a position corresponding to a rear end of the glass-surface-side flange part in the door-side flange part.

In many cases, when a collision load is applied to a front pillar outer, compressive stress is liable to be applied to a door-side flange part in a curved region in the vicinity of the rear end of the front pillar outer. Therefore, in the aforementioned region, if the first member overlaps with and is joined to the second member, buckling of the front pillar outer can be suppressed and the strength of the front pillar outer increases.

In the aforementioned front pillar outer, when the length of the glass-surface-side flange part is represented by "L", preferably a region where the second glass-surface-side flange part overlaps with the first glass-surface-side flange part is provided in at least one part of or over all of a range between L×¼ and L×⅔ from a fore end of the glass-surface-side flange part.

As will be described later, when a collision load is applied to a front pillar outer, in some cases compressive stress is applied to the glass-surface-side flange part. Therefore, in the aforementioned region, if the first member overlaps with and is joined to the second member, buckling of the front pillar outer can be suppressed and the strength of the front pillar outer increases.

In the aforementioned front pillar outer, preferably the sheet thickness of the second member is 0.60 mm or more and 1.60 mm or less. More preferably, the lower limit of the sheet thickness of the second member is 0.85 mm or more. Further preferably, the upper limit of the sheet thickness of the second member is 1.05 mm or less. Further, the tensile strength of the first member and the second member is preferably 800 MPa or more. More preferably, the tensile strength of the first member and the second member is 1200 MPa or more. Furthermore, preferably the tensile strength of the second member is higher than the tensile strength of the first member.

Preferably the first member is joined with the second member by laser welding, spot welding, mechanical fastening or an adhesive, or by a combination of these joining methods. The first member and the second member may be joined after being individually formed, respectively, or may be joined in the state of pre-shaped sheets, and then formed.

In this case, the front pillar outer is suitable as a front pillar outer for an automobile.

In the present description, the terms "front", "rear", "left", "right", "upward" and "downward" correspond to the "front", "rear", "left", "right", "upward direction" and "downward direction" of the vehicle, respectively. In the drawings, reference characters "F", "Re", "Le", "R", "U" and "D" mean the "front", "rear", "left", "right", "upward direction" and "downward direction" of the vehicle, respectively.

An embodiment of the present invention is described in detail below with reference to the accompanying drawings. The same reference symbols will be used throughout the drawings to refer to the same or like parts, and description thereof will not be repeated.

[Front Pillar 4]

Figure 1:
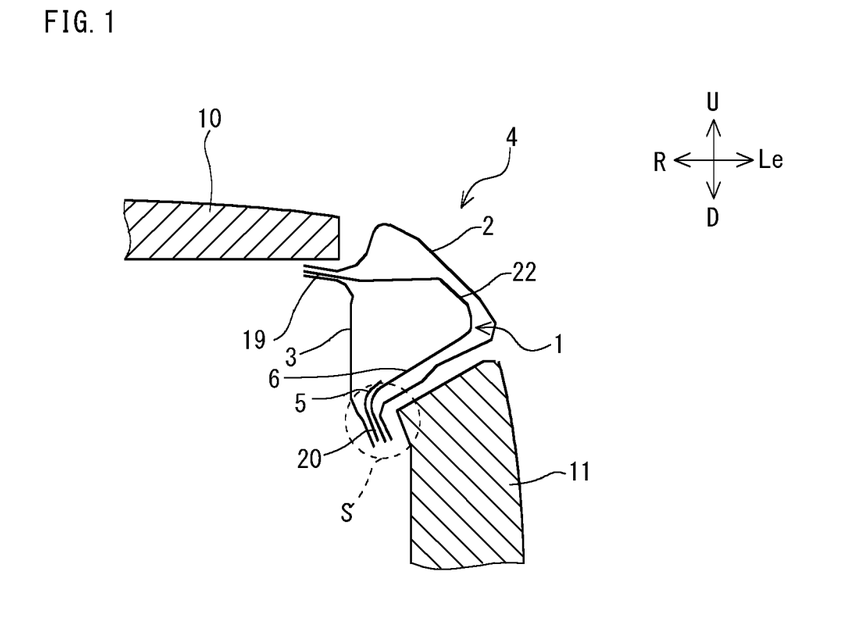
FIG. 1 is a cross-sectional view of a front pillar.

FIG. 1 is a cross-sectional view of a front pillar 4 (of a development structure) of the present embodiment. In the present description, the term "front pillar 4" means a front pillar upper constituting the framework of a vehicle body, that supports the windshield glass. Accordingly, a "front pillar outer 1" is a member that constitutes the front pillar upper. Further, the term "cross-section" in the present description means a cross-section that is perpendicular to the longitudinal direction of the front pillar outer 1, and the term "longitudinal direction" means the direction from the fore end towards the rear end of the front pillar outer 1.

Figure 2:
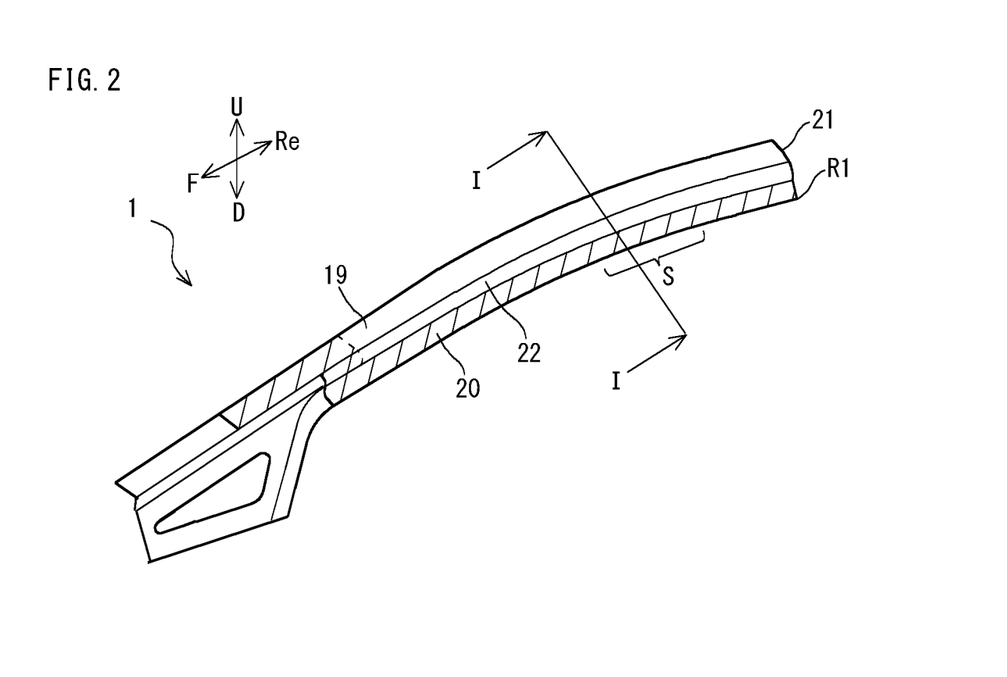
FIG. 2 is a perspective view of a front pillar outer.

FIG. 1 illustrates a cross-section of a left front pillar of a vehicle. Further, FIG. 1 is a cross-sectional view along a cutting plane line I-I in FIG. 2 that is described later. Note that, for convenience of description, only the front pillar outer 1 is illustrated in FIG. 2. Referring to FIG. 1, the front pillar 4 includes a side panel 2, a front pillar inner 3 and the front pillar outer 1. The side panel 2 is disposed further to the outer side of the vehicle than the front pillar inner 3 and the front pillar outer 1. The side panel 2 and the front pillar inner 3 form a closed cross-section. The front pillar outer 1 is disposed within the closed cross-section that the side panel 2 and the front pillar inner 3 form. The front pillar outer 1 serves a function of reinforcing the front pillar 4.

A glass-surface-side flange part 19 of the front pillar outer 1 is joined by welding or the like to the side panel 2 and the front pillar inner 3. In the present description, the term "glass-surface-side flange part 19" means a region that directly or indirectly supports a windshield glass 10 of the vehicle in the front pillar outer 1. The glass-surface-side flange part 19 supports the windshield glass 10 of the vehicle, together with the side panel 2 and the front pillar inner 3. A door-side flange part 20 is joined by welding or the like to the side panel 2 and the front pillar inner 3. In the present description, the term "door-side flange part 20" means a region that directly or indirectly faces a door 11 of the vehicle in the front pillar outer 1. The door-side flange part 20 faces the door 11 of the vehicle, together with the side panel 2 and the front pillar inner 3. The cross-sectional shape of the front pillar outer 1 is a hat shape.

[Front Pillar Outer 1]

FIG. 2 is a perspective view of the front pillar outer 1. As illustrated in FIG. 2, the front pillar outer 1 includes the glass-surface-side flange part 19, the door-side flange part 20, and a main body part 22. The main body part 22 is disposed between the glass-surface-side flange part 19 and the door-side flange part 20 in the width direction of the front pillar outer 1, and connects the glass-surface-side flange part 19 and the door-side flange part 20.

Figure 3:
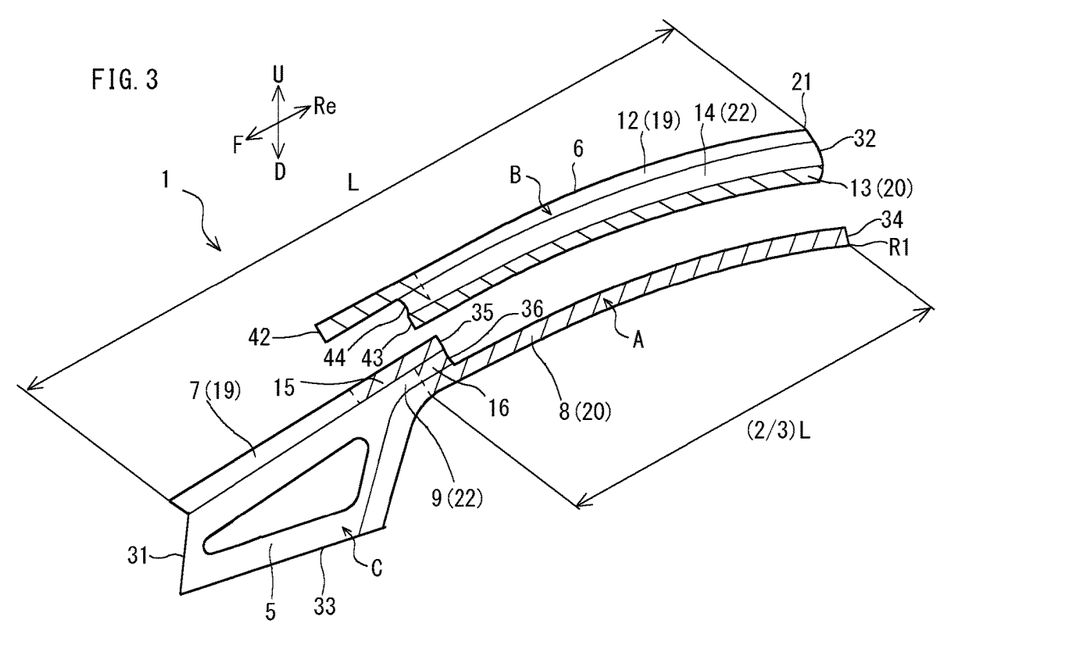
FIG. 3 is an exploded view of the front pillar outer illustrated in FIG. 2.

FIG. 3 is an exploded view of the front pillar outer 1 illustrated in FIG. 2. As illustrated in FIG. 3, the front pillar outer 1 of the present embodiment includes a first member 5 and a second member 6.

[First Member 5]

The first member 5 extends from the fore end towards the rear end of the front pillar outer 1. The material of the first member 5 is, for example, a steel sheet. The first member 5 includes a first glass-surface-side flange part 7, a first door-side flange part 8 and a first main body part 9.

The first glass-surface-side flange part 7 is, in the first member 5, a region that directly or indirectly supports the windshield glass 10 illustrated in FIG. 1. The first glass-surface-side flange part 7 extends to a range of a predetermined distance from a fore end 31 of the front pillar outer 1 along the longitudinal direction. The first glass-surface-side flange part 7 does not extend as far as a rear end 32 of the front pillar outer 1, and a rear end 35 of the first glass-surface-side flange part 7 is positioned further frontward than the rear end 32 of the front pillar outer 1. In other words, the first glass-surface-side flange part 7 constitutes a part of the glass-surface-side flange part 19 of the front pillar outer 1. In the present description, the phrase "constitutes a part of the glass-surface-side flange part 19" means constitutes a part in the longitudinal direction of the glass-surface-side flange part 19 of the front pillar outer 1. The same applies with respect to the door-side flange part 20 and the main body part 22 which are described later.

The first door-side flange part 8 is, in the first member 5, a region that directly or indirectly faces the door 11 illustrated in FIG. 1. A frontward region of the first door-side flange part 8 extends upward and rearward from a lower end 33 of the front pillar outer 1. The rearward region of the first door-side flange part 8 is a region that is joined to a second door-side flange part 13 of the second member 6 that is described later, and a rear end 34 of the first door-side flange part 8 extends as far as the rear end 32 of the front pillar outer 1 along the longitudinal direction.

The first main body part 9 is positioned between the first glass-surface-side flange part 7 and the first door-side flange part 8, in the width direction of the front pillar outer 1. The first main body part 9 connects the first glass-surface-side flange part 7 and the first door-side flange part 8. The first main body part 9 extends to the same range of a predetermined distance as the first glass-surface-side flange part 7 from the fore end 31 and the lower end 33 of the front pillar outer 1. The first main body part 9 does not extend as far as the rear end 32 of the front pillar outer 1. In other words, the first main body part 9 constitutes a part of the main body part 22 of the front pillar outer 1.

[Second Member 6]

The second member 6 extends frontward from the rear end 32 of the front pillar outer 1. The material of the second member 6 is, for example, a steel sheet. The sheet thickness of the second member 6 is thinner than the sheet thickness of the first member 5. The second member 6 includes a second glass-surface-side flange part 12, the second door-side flange part 13 and a second main body part 14.

In the second member 6, the second glass-surface-side flange part 12 is a region that directly or indirectly supports the windshield glass 10 illustrated in FIG. 1. The second glass-surface-side flange part 12 extends to a range of a predetermined distance towards the front from the rear end 32 of the front pillar outer 1 along the longitudinal direction. The second glass-surface-side flange part 12 does not extend as far as the fore end 31 of the front pillar outer 1, and a fore end 42 of the second glass-surface-side flange part 12 is positioned between the rear end 32 and the fore end 31 of the front pillar outer 1. Note that, the fore end 42 of the second glass-surface-side flange part 12 illustrated in FIG. 3 is located at a position that is rearward from the fore end 31 of the front pillar outer 1 by a distance equivalent to L×¼. In other words, the second glass-surface-side flange part 12 constitutes one part of the glass-surface-side flange part 19 of the front pillar outer 1.

In the second member 6, the second door-side flange part 13 is a region that directly or indirectly faces the door 11 illustrated in FIG. 1. The second door-side flange part 13 extends to a range of a predetermined distance towards the front from the rear end 32 of the front pillar outer 1 along the longitudinal direction. The length in the longitudinal direction of the second door-side flange part 13 is shorter than the length of the second glass-surface-side flange part 12, and a fore end 43 of the second door-side flange part 13 is positioned further rearward than the fore end 42 of the second glass-surface-side flange part 12. In other words, the second door-side flange part 13 constitutes one part of the door-side flange part 20 of the front pillar outer 1.

The second main body part 14 is positioned between the second glass-surface-side flange part 12 and the second door-side flange part 13 in the width direction of the front pillar outer 1. The second main body part 14 connects the second glass-surface-side flange part 12 and the second door-side flange part 13. The second main body part 14 extends to the same range of a predetermined distance as the second door-side flange part 13 from the rear end 32 of the front pillar outer 1 along the longitudinal direction. The second main body part 14 does not extend as far as the fore end 31 of the front pillar outer 1. In other words, the second main body part 14 constitutes one part of the main body part 22 of the front pillar outer 1.

In short, the glass-surface-side flange part 19 of the front pillar outer 1 is constituted by the first glass-surface-side flange part 7 and the second glass-surface-side flange part 12. The door-side flange part 20 of the front pillar outer 1 is constituted by the first door-side flange part 8 and the second door-side flange part 13. The main body part 22 of the front pillar outer 1 is constituted by the first main body part 9 and the second main body part 14.

The front pillar outer 1 having the foregoing configuration includes three strength regions (a first strength region A, a second strength region B, and a third strength region C) that have different strengths (sheet thicknesses) to each other.

[First Strength Region A]

In the present description, the term "first strength region A" means a region where the first member 5 overlaps with and is joined to the second member 6. The position at which the first strength region A is provided will now be described.

As illustrated in FIG. 3, one part of the first door-side flange part 8 protrudes further towards the rear end 32 of the front pillar outer 1 than the first glass-surface-side flange part 7 and the first main body part 9. The protruding portion of the first door-side flange part 8 overlaps with and is joined to the second door-side flange part 13. In other words, the first strength region A is provided at one part of the door-side flange part 20 of the front pillar outer 1.

Since the sheet thickness of the first strength region A is the sum of the sheet thickness of the first member 5 and the sheet thickness of the second member 6, the first strength region A is thicker than the other regions. Therefore, the strength of the first strength region A is higher than the strength of the other regions.

Figure 4:
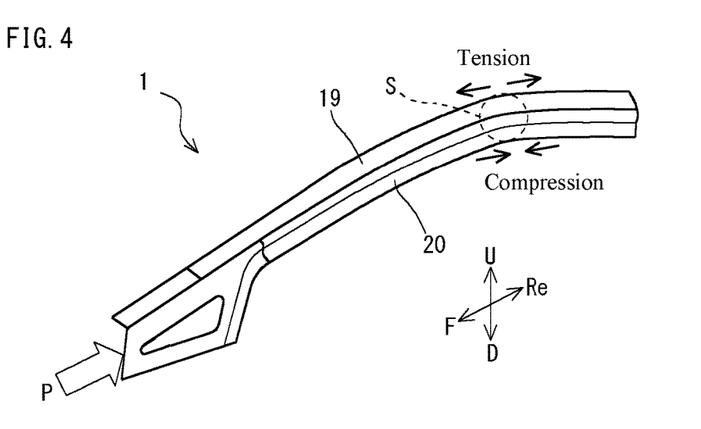
FIG. 4 is a perspective view illustrating a front pillar outer to which a collision load has been applied.

FIG. 4 is a perspective view illustrating the front pillar outer 1 to which a collision load has been applied. Referring to FIG. 4, in an assembled vehicle, the fore end of the front pillar outer 1 is disposed at a lower position than the rear end thereof. When the vehicle is involved in a head-on collision, a collision load P is applied to the fore end of the front pillar outer 1. As illustrated in FIG. 2, the front pillar outer 1 has a shape that curves in the upward direction from the fore end to the rear end. When the collision load P is applied from the front of the front pillar outer 1, stress concentrates at a curving portion of the front pillar outer 1, and the curving portion attempts to break and bend in the upward direction. Consequently, when the collision load P is applied to the front pillar outer 1, compressive stress is applied to the door-side flange part 20, and tensile stress is applied to the glass-surface-side flange part 19.

If the compressive stress becomes excessively large, the front pillar outer 1 will buckle and will break and bend in the upward direction. If the front pillar outer 1 buckles, the collision energy absorption capability of the front pillar outer 1 will markedly decrease. Accordingly, to increase the strength of the front pillar outer 1, it is necessary to suppress buckling of the front pillar outer 1.

To suppress buckling of the front pillar outer 1, it is effective to increase the strength of regions where compressive stress is applied. In the case of the front pillar outer 1, the most compressive stress is applied to a region where the curvature of the door-side flange part 20 is greatest that is indicated by a region S in FIG. 1 when seen in cross-sectional view, and is indicated by a region S in FIG. 2 when seen in perspective view. The first strength region A which has the highest strength among the three strength regions is provided in the portion where compressive stress is applied, that is, the door-side flange part 20. By this means, it is difficult for the front pillar outer 1 to buckle, and the strength of the front pillar outer 1 increases.

The first strength region A is provided in not only one part of the door-side flange part 20, but is also provided in one part of the glass-surface-side flange part 19. As illustrated in FIG. 3, a portion (rearward region 15) that is a predetermined distance from the rear end 35 of the first glass-surface-side flange part 7 overlaps with and is joined to a portion that is a predetermined distance from the fore end 42 of the second glass-surface-side flange part 12. From a different viewpoint, this situation can also be described as follows. The frontward region of the second glass-surface-side flange part 12 protrudes further towards the fore end 31 of the front pillar outer 1 than the second door-side flange part 13 and the second main body part 14. The protruding portion of the second glass-surface-side flange part 12 overlaps with and is joined to the first glass-surface-side flange part 7. Further, a portion of the second glass-surface-side flange part 12 that is further rearward by a predetermined distance from the protruding portion of the second glass-surface-side flange part 12 also overlaps with and is joined to the first glass-surface-side flange part 7. In other words, the first strength region A is also provided at a part of the glass-surface-side flange part 19 of the front pillar outer 1.

The first strength region A is also provided at a part of the main body part 22, and not only at a part of the door-side flange part 20 and a part of the glass-surface-side flange part 19. A portion (rearward region 16) that is a predetermined distance from a rear end 36 of the first main body part 9 overlaps with and is joined to a portion that is a predetermined distance from a fore end 44 of the second main body part 14. In other words, the first strength region A is also provided at one part of the main body part 22 of the front pillar outer 1.

The frontward region of the second glass-surface-side flange part 12 overlaps with and is joined to the rearward region 15 of the first glass-surface-side flange part 7. The frontward region of the second main body part 14 overlaps with and is joined to the rearward region 16 of the first main body part 9. In other words, the first member 5 overlaps with and is joined to the second member 6 at the glass-surface-side flange part 19 and the main body part 22 also, in addition to the door-side flange part 20. By this means, the first member 5 is securely fixed to the second member 6. Further, by this means, the first strength region A can also be provided in the glass-surface-side flange part 19 and the main body part 22. Note that, the second glass-surface-side flange part 12 need not be joined as far as the fore end of the first glass-surface-side flange part 7. The same applies with respect to joining of the second main body part 14 and the first main body part 9.

As described later, depending on the shape of the front pillar outer 1, in some cases compressive stress is applied to the glass-surface-side flange part 19. In such a case, the strength of the front pillar outer 1 will further increase if the first strength region is also provided at the region of the glass-surface-side flange part 19 where compressive stress is applied.

[Second Strength Region B]

In the present description, the term "second strength region B" means a region where the front pillar outer 1 is constituted by only the second member 6. The rearward region of the second glass-surface-side flange part 12 does not overlap with the first member 5. The rearward region of the second main body part 14 does not overlap with the first member 5. In other words, the second strength region B is provided at one part (the rearward region) of the glass-surface-side flange part 19 and one part (the rearward region) of the main body part 22. As mentioned above, the sheet thickness of the second member 6 is thinner than the sheet thickness of the first member 5. Accordingly, the weight of the front pillar outer 1 that includes the second strength region B is lighter in comparison to a front pillar outer in which the whole area of the second member 6 overlaps with and is joined to the first member 5.

As mentioned above, the buckling resistance strength of a front pillar outer depends greatly on the compressive stress. Accordingly, the strength of a region where tensile stress is applied can be made lower than the strength of a region where compressive stress is applied. In the case of the front pillar outer 1, tensile stress is applied to the glass-surface-side flange part 19. In other words, the strength of the glass-surface-side flange part 19 can be made lower than the strength of the door-side flange part 20. Therefore, the second strength region B is provided at one part of the glass-surface-side flange part 19. In addition, the second strength region B is also provided at one part of the main body part 22 at which lower stress is applied in comparison to the glass-surface-side flange part 19 and the door-side flange part 20.

[Third Strength Region C]

In the present description, the term "third strength region C" means a region where the front pillar outer 1 is constituted by only the first member 5. When the vehicle is involved in a head-on collision, a collision load is applied to the fore end 31 of the front pillar outer 1. Therefore, it is desirable that the strength is high in the region from the fore end 31 of the front pillar outer 1 to the first strength region A, that is, in the third strength region C, and it is thus desirable that the sheet thickness in the aforementioned region is thick. Therefore, the first member 5 which has a higher strength and a thicker sheet thickness than the second member 6 is present in the third strength region C that is the front part of the front pillar outer 1.

As described above, the front pillar outer 1 of the present embodiment includes two members, namely, the first member 5 and the second member 6. In a region where compressive stress is applied, the first member 5 overlaps with and is joined to the second member 6 (the first strength region A). By this means, the strength of the front pillar outer 1 increases. In a region where tensile stress is applied, the front pillar outer 1 is constituted by only the second member 6 whose sheet thickness is thinner than the sheet thickness of the first member 5 (second strength region B). By this means, the weight of the front pillar outer 1 is lightened. At the front part of the front pillar outer 1, the first member 5 whose sheet thickness is thicker than the sheet thickness of the second member 6 is present, and constitutes the front pillar outer 1 (third strength region C). By this means, the strength of the front part of the front pillar outer 1 increases. In short, the front pillar outer 1 of the present embodiment includes three strength regions. The three strength regions are respectively provided at appropriate regions in the longitudinal direction and the width direction of the front pillar outer 1. Note that, the term "width direction" as used in the present embodiment means a direction which is orthogonal to the longitudinal direction and which is a direction towards the door-side flange part 20 from the glass-surface-side flange part 19 of the front pillar outer 1. By this means, the weight of the front pillar outer 1 is lightened, and the strength of the front pillar outer 1 is increased. Further, in this development structure, members can be provided with regions which have a strength that is greater than or equal to the strength of the material that is used.

The front pillar outer 1 of the present embodiment is particularly effective in the case of a localized collision (small overlap) at a region to the left or right of a front side member of a vehicle.

Next, a preferred aspect of the front pillar outer 1 of the present embodiment is described.

[Range of First Strength Region A of Door-Side Flange Part 20]

Figure 5:
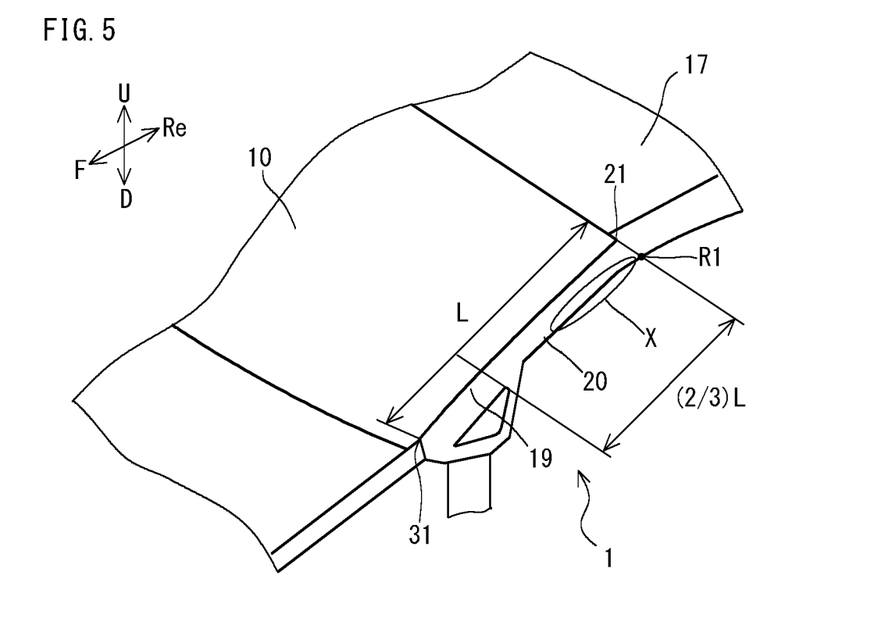
FIG. 5 is a view illustrating a part of a vehicle body structure that includes a front pillar outer.

FIG. 5 is a view illustrating one part of a vehicle body structure that includes the front pillar outer 1. The side panel of the front pillar is omitted from the illustration in FIG. 5. Referring to FIG. 5, the rear end of the front pillar is joined to a roof 17 of the vehicle. The roof 17 of the vehicle is provided approximately horizontally to the ground surface. On the other hand, the windshield glass 10 of the vehicle is arranged at an inclination with respect to the ground surface. Therefore, the front pillar curves in the vicinity of the rear end thereof. Accompanying such curving of the front pillar, the front pillar outer 1 also curves in the vicinity of the rear end thereof.

A load that is applied to the front pillar, and the first strength region A will now be described using the drawings. When a collision load is applied to the front pillar outer 1, as illustrated in FIG. 4, a compressive stress is liable to be applied to the door-side flange part 20 of a curved region S in the vicinity of the rear end of the front pillar outer 1. The shape of the front pillar outer 1 will differ according to the vehicle type. However, in most cases, as illustrated in FIG. 5, in the door-side flange part 20, compressive stress is applied to one part of or all of a range of $L \times 2/3$ from a position R1 that corresponds to a rear end 21 of the glass-surface-side flange part 19. Here, "L" represents the arc length (length in the longitudinal direction) along the edge on the door side of the glass-surface-side flange part 19 of the front pillar outer 1.

Accordingly, preferably the first strength region A is provided in at least one part in the range to the position at a distance equivalent to $L \times 2/3$ from the position R1 that corresponds to the rear end 21 of the glass-surface-side flange part 19, in the door-side flange part 20 of the front pillar outer 1.

More preferably, the first strength region A is provided over the entire range to the position at a distance equivalent to $L \times 2/3$ from the position R1 that corresponds to the rear end 21 of the glass-surface-side flange part 19, in the door-side flange part 20 of the front pillar outer 1 as illustrated in FIG. 3. In this case, the rear end 34 of the first door-side flange part 8 extends as far as the rear end 32 of the front pillar outer 1. In other words, when seen from above, the rear end 34 of the first door-side flange part 8 overlaps with the rear end 32 of the front pillar outer 1.

The range of the first strength region A of the door-side flange part 20 is not limited to the aforementioned range, and may be provided in the following range.

Figure 9:
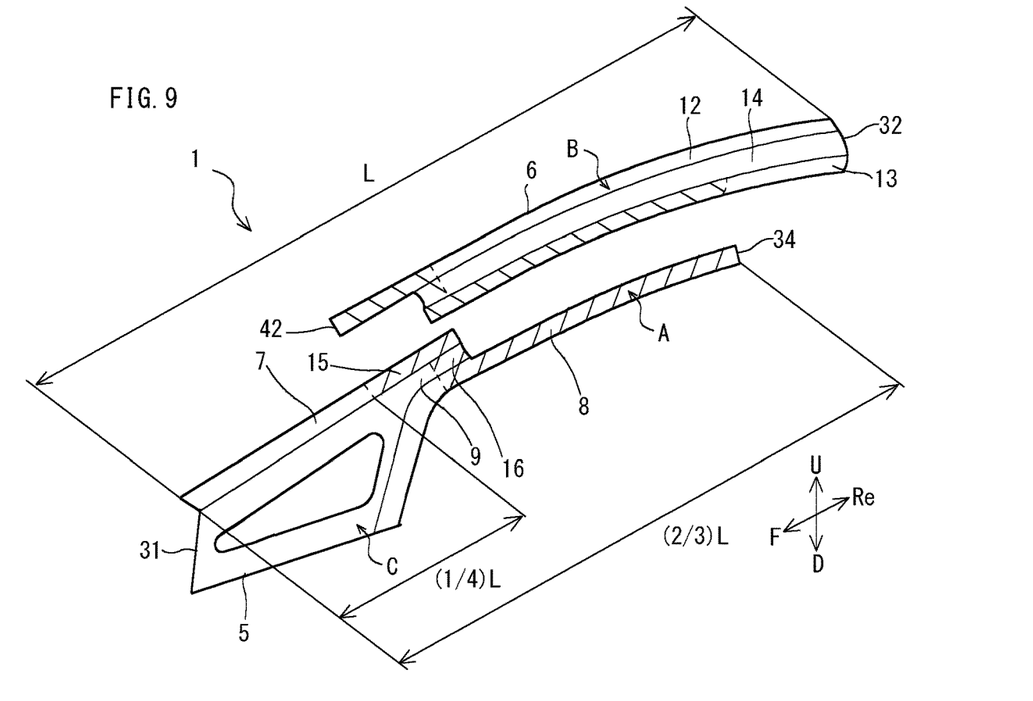
FIG. 9 is an exploded view of a front pillar outer in which a first door-side flange part is shorter than in the front pillar outer illustrated in FIG. 3.

FIG. 9 is an exploded view of a front pillar outer 1 in which the first door-side flange part 8 is shorter than in the front pillar outer 1 illustrated in FIG. 3. In the front pillar outer 1 illustrated in FIG. 9, the rear end 34 of the first door-side flange part 8 is located at a position that is frontward from the rear end 32 of the front pillar outer 1 by a distance equivalent to $L \times 1/3$. In other words, in the front pillar outer 1 illustrated in FIG. 9, the rear end 34 of the first door-side flange part 8 is located at a position that is rearward from the fore end 31 of the front pillar outer 1 by a distance equivalent to $L \times 2/3$. Further, the fore end 42 of the second glass-surface-side flange part 12 is located at a position that is rearward from the fore end 31 of the front pillar outer 1 by a distance equivalent to $L \times 1/4$.

In the front pillar outer 1 illustrated in FIG. 9 that is configured as described above, the first door-side flange part 8 is shorter compared to the first door-side flange part 8 of the front pillar outer 1 illustrated in FIG. 3. The range of the first strength region A in the door-side flange part 20 is narrower compared to the case of the front pillar outer 1 illustrated in FIG. 3. However, even in the front pillar outer 1 illustrated in FIG. 9, because the first strength region A is provided in a region at which compressive stress is applied, the weight of the front pillar outer 1 can be reduced while maintaining high strength.

[Range of First Strength Region A in GlassSurface-Side Flange Part 19]

Figure 10:
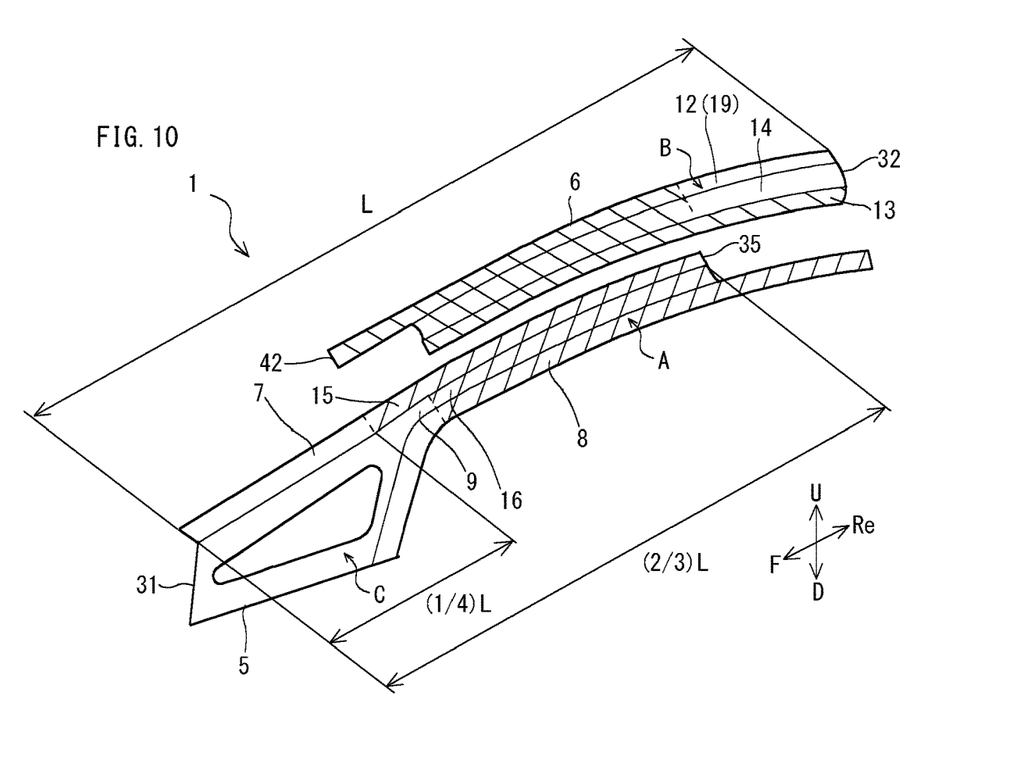
FIG. 10 is an exploded view of a front pillar outer in which a first glass-surface-side flange part is longer than in the front pillar outer illustrated in FIG. 3.

FIG. 10 is an exploded view of a front pillar outer 1 in which the first glass-surface-side flange part 7 is longer than in the front pillar outer 1 illustrated in FIG. 3. In the front pillar outer 1 illustrated in FIG. 10, the rear end 35 of the first glass-surface-side flange part 7 is located at a position that is rearward from the fore end 31 of the front pillar outer 1 by a distance equivalent to $L \times 2/3$ or more. Further, the fore end 42 of the second glass-surface-side flange part 12 is located at a position that is rearward from the fore end 31 of the front pillar outer 1 by a distance equivalent to $L \times 1/4$. In other words, in the front pillar outer 1 illustrated in FIG. 10, the first strength region A in the glass-surface-side flange part 19 is provided over the entire range from a position that is at a distance equivalent to $L \times 1/4$ from the fore end 31 of the front pillar outer 1 to a position that is at a distance equivalent to $L \times 2/3$ from the fore end 31 of the front pillar outer 1.

When a collision load is applied to the front pillar outer 1, in some cases compressive stress is applied to the glass-surface-side flange part 19. More specifically, in some cases a compressive load is applied to one part of or all of a range of $L \times 2/3$ from the fore end of the glass-surface-side flange part 19 (fore end 31 of the front pillar outer 1).

According to the front pillar outer 1 illustrated in FIG. 10, the first glass-surface-side flange part 7 is longer in comparison to the front pillar outer 1 illustrated in FIG. 3. In comparison to the front pillar outer 1 illustrated in FIG. 3, the range of the first strength region A in the glass-surface-side flange part 19 is wider by an amount corresponding to the increase in the length of the first glass-surface-side flange part 7. Therefore, the strength of the glass-surface-side flange part 19 increases further, and even in a case where compressive stress is applied to the glass-surface-side flange part 19, high buckling resistance strength can be exhibited.

[Sheet Thickness]

The sheet thickness of the second member 6 is preferably 0.60 mm or more and 1.60 mm or less. If the sheet thickness of the second member 6 is less than 0.60 mm, the strength of the second member 6 will be too low. Therefore, it will be difficult to adequately secure the strength of the second strength region B. Accordingly, the lower limit of the sheet thickness of the second member 6 is preferably 0.60 mm or more. If the sheet thickness of the second member 6 is thicker than 1.60 mm, the weight of the second member 6 will be too heavy. Accordingly, the upper limit of the sheet thickness of the second member 6 is preferably 1.60 mm. Further preferably, based on Example 2 that is described later, the lower limit of the sheet thickness of the second member 6 is 0.85 mm or more. Further preferably, based on Example 2 that is described later, the upper limit of the sheet thickness of the second member 6 is 1.05 mm or less. However, the aforementioned range of the sheet thickness indicates a favorable range. Therefore, even if the sheet thickness of the second member 6 is more than the aforementioned sheet thickness range, it is possible to reduce the weight and increase the strength of the front pillar outer 1.

It suffices that the sheet thickness of the first member 5 is thicker than the sheet thickness of the second member 6, and the sheet thickness of the first member 5 is not particularly limited. For example, in the case of a front pillar for an automobile, the sheet thickness of the first member 5 is preferably 1.2 mm or more and 1.5 mm or less. A ratio of the sheet thickness of the second member 6 to the sheet thickness of the first member 5 (sheet thickness of second member 6/sheet thickness of first member 5) is less than 1. Although it is not particularly necessary to define a lower limit of the ratio, the lower limit thereof may be defined as 0.5, 0.6 or 0.7. The upper limit may be defined as 0.9, 0.8 or 0.75.

Further, when the objective of the present invention that is to provide the front pillar outer 1 which is lightweight and high-strength is achieved, the weight reduction ratio that is described later is greater than 0%. In other words, when the objective of the present invention is achieved, when a region from the fore end of the second member 6 (the fore end 42 of the second glass-surface-side flange part 12) to the rear end 32 of the front pillar outer 1 is taken as an evaluation region, and the area ratio of the second strength region B with respect to the total area of the evaluation region is represented by "b", the area ratio of the third strength region C with respect to the total area is represented by "c", the sheet thickness of the first member 5 is represented by "t1", and the sheet thickness of the second member 6 is represented by "t2", the following formula is satisfied.

$$c-(t2/t1)\times(1-b)>0$$

Where, $0<b<1$, $0<c<1$, $0<t2/t1<1$.

[Tensile Strength]

The tensile strength of each of the first member 5 and the second member 6 is preferably 800 MPa or more. If the tensile strength of the first member 5 is less than 800 MPa, it will be difficult to adequately secure the strength of the third strength region. Therefore, preferably the lower limit of the tensile strength of the first member 5 is 800 MPa or more. If the tensile strength of the second member 6 is less than 800 MPa, it will be difficult to adequately secure the strength of the second strength region. Therefore, preferably the lower limit of the tensile strength of the second member 6 is 800 MPa or more. More preferably, the tensile strength of each of the first member 5 and the second member 6 is 1200 MPa or more. Further preferably, the tensile strength of each of the first member 5 and the second member 6 is 1500 MPa or more. However, the aforementioned range of the tensile strength indicates a favorable range. Therefore, even if the tensile strength is more than the aforementioned tensile strength range, it is possible to reduce the weight and increase the strength of the front pillar outer.

As mentioned above, tensile stress is applied to the second strength region. The second strength region is constituted by only the second member 6. Further, the second member 6 is thinner than the first member 5. In other words, the strength required for the second member 6 is higher than the strength required for the first member 5. Accordingly, the tensile strength of the second member 6 is preferably higher than the tensile strength of the first member 5.

[Joining]

Preferably, the first member 5 is joined to the second member 6 by laser welding, spot welding, mechanical fastening or an adhesive or by a combination of these joining methods. In particular, if laser welding or spot welding is used, the first member 5 can be easily joined to the second member 6. By this means, the productivity with respect to the front pillar outer 1 increases. In addition, in the case of joining by laser welding or spot welding, the strength of the first strength region can be further increased by combining the use of an adhesive therewith. In the case of spot welding, the interval between welding locations is preferably within a range of 5 to 30 mm. In this case, the term "interval" means the distance between center points of adjacent welding locations in plan view. If the interval between the welding locations is more than 30 mm, there is a risk that, when a collision load is applied to the front pillar outer 1, the load will concentrate at some welding locations among the multiple welding locations. Therefore, the upper limit of the interval between welding locations is preferably 30 mm, and more preferably is 10 mm. In other words, the smaller that the interval between welding locations is, the more preferable it is. However, if the interval between welding locations is less than 5 mm, there is a risk that a branch current will arise during welding. Therefore, the lower limit of the interval between welding locations is preferably 5 mm. Note that, the first member 5 and the second member 6 may be joined after being individually formed, respectively, or may be joined in the state of pre-shaped sheets, and then formed.

Example 1

To check the effects of the front pillar outer of the present embodiment, a collision load application test was simulated with respect to the front pillar outer by computer aided engineering (CAE) analysis. The model for an Inventive Example 1 of the present invention was the front pillar outer 1 illustrated in FIG. 2 and FIG. 3. The model for a Comparative Example was a front pillar outer constituted by only one member in which the sheet thickness was constant. The equivalent plastic strain of the Inventive Example of the present invention and the Comparative Example were compared using the obtained analysis results.

[Analysis Conditions]

Figure 6:
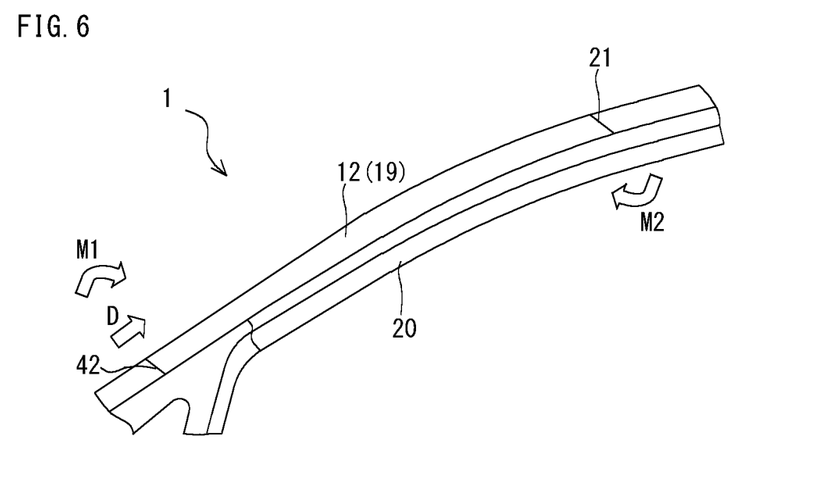
FIG. 6 is a view illustrating analysis conditions of Example 1.

FIG. 6 is a view illustrating the analysis conditions of Example 1. Referring to FIG. 6, a displacement D was applied to the longitudinal cross-section of the front pillar outer 1 at the fore end 42 of the second glass-surface-side flange part 12, and a displacement in the longitudinal direction at the rear end of the second glass-surface-side flange part 12 (rear end 21 of glass-surface-side flange part 19) was fixed. A bending moment M1 occurred due to the displacement D. The bending moment M1 was in the clockwise direction as viewed from the left of the vehicle. For the displacement D, the direction from the fore end towards the rear end of the front pillar outer 1 was defined as positive. A bending moment M2 occurred at the rear end 21 of the glass-surface-side flange part 19 due to the displacement D. The bending moment M2 was in the clockwise direction as viewed from the left of the vehicle. For the Comparative Example, unlike the Inventive Example of the present invention, a front pillar outer which was constituted by only one member was adopted.

Table 1 shows the analysis conditions for Example 1. The sheet thickness of the models for the Inventive Example 1 of the present invention and the Comparative Example was 1.25 (mm), and the tensile strength was 1500 (MPa). The other dimensions and shape of the Inventive Example 1 of the present invention were the same as the Comparative Example.

TABLE 1

|  | First Member | | Second Member | | |
| --- | --- | --- | --- | --- | --- |
|  | Sheet Thickness (mm) | Tensile Strength (MPa) | Sheet Thickness (mm) | Tensile Strength (MPa) | Joining Method |
| Inventive Example 1 of Present Invention | 1.25 | 1500 | 0.85 | 1500 | Laser Welding |
| Comparative Example | 1.25 | 1500 | — | — | — |

[Results]

According to the results for the Comparative Example, equivalent plastic strain due to compressive strain occurred at the door-side flange part 20 that corresponded to a range of L×⅔ from the rear end 21 of the glass-surface-side flange part 19. In other words, compressive stress occurred. The maximum value of equivalent plastic strain that occurred at the door-side flange part 20 immediately before buckling was 0.00176. Further, equivalent plastic strain due to compressive strain occurred in a range of L×⅓ from the fore end of the glass-surface-side flange part 19 (fore end 31 of the front pillar outer 1). The maximum value of equivalent plastic strain that occurred at the glass-surface-side flange part 19 immediately before buckling was 0.00135.

According to the results for the Inventive Example 1 of the present invention, the ranges in which equivalent plastic strain occurred in the door-side flange part 20 and the glass-surface-side flange part 19 were narrower than in the Comparative Example. The maximum value of equivalent plastic strain that occurred in the door-side flange part 20 was 0.000079. The maximum value of equivalent plastic strain that occurred in the glass-surface-side flange part 19 was 0.0012.

In short, in the front pillar outer of Inventive Example 1 of the present invention, the ranges in which compressive stress occurred were narrower than in the Comparative Example, and the magnitude of the compressive stress was smaller than in the Comparative Example.

Example 2

In Example 2, the sheet thickness and the range of the first strength region of the second member 6 were changed to various values, and the strength and weight of the front pillar outer were investigated by CAE analysis.

[Analysis Conditions]

TABLE 2

|  | First Member | | Second Member | | | | |
| --- | --- | --- | --- | --- | --- | --- | --- |
|  | Sheet Thickness (mm) | Tensile Strength (MPa) | Sheet Thickness (mm) | Tensile Strength (MPa) | Joining Method | Weight Reduction Ratio (%) | Maximum Load (kN) |
| Inventive Example 1 of Present Invention | 1.25 | 1500 | 0.85 | 1500 | Laser welding | 26.44 | 117.81 |
| Inventive Example 2 of Present Invention | 1.25 | 1500 | 0.95 | 1500 | Laser welding | 18.59 | 126.27 |
| Inventive Example 3 of Present Invention | 1.25 | 1500 | 1.05 | 1500 | Laser welding | 10.74 | 134.57 |
| Inventive Example 4 of Present Invention | 1.25 | 1500 | 0.85 | 1500 | Spot welding | 26.44 | 111.07 |
| Inventive Example 5 of Present Invention | 1.25 | 1500 | 0.95 | 1500 | Spot welding | 18.59 | 118.45 |
| Inventive Example 6 of Present Invention | 1.25 | 1500 | 1.05 | 1500 | Spot welding | 10.74 | 127.03 |
| Inventive Example 7 of Present Invention | 1.25 | 1500 | 0.85 | 1500 | Laser welding | 27.04 | 115.81 |
| Inventive Example 8 of Present Invention | 1.25 | 1500 | 0.95 | 1500 | Laser welding | 19.28 | 124.27 |
| Inventive Example 9 of Present Invention | 1.25 | 1500 | 1.05 | 1500 | Laser welding | 11.52 | 132.57 |
| Inventive Example 10 of Present Invention | 1.25 | 1500 | 0.85 | 1500 | Laser welding | 23.04 | 119.81 |
| Inventive Example 11 of Present Invention | 1.25 | 1500 | 0.95 | 1500 | Laser welding | 15.28 | 128.27 |
| Inventive Example 12 of Present Invention | 1.25 | 1500 | 1.05 | 1500 | Laser welding | 7.52 | 136.57 |
| Inventive Example 13 of Present Invention | 1.25 | 1500 | 0.85 | 1500 | Laser welding and adhesive | 26.44 | 120.81 |
| Inventive Example 14 of Present Invention | 1.25 | 1500 | 0.95 | 1500 | Laser welding and adhesive | 18.59 | 129.27 |
| Inventive Example 15 of Present Invention | 1.25 | 1500 | 1.05 | 1500 | Laser welding and adhesive | 10.74 | 137.57 |
| Comparative Example | 1.25 | 1500 | — | — | — | — | 109.29 |

In the Inventive Examples 1 to 6 of the present invention, the front pillar outer 1 illustrated in FIG. 3 was used as the analytical model, similarly to Example 1. In the Inventive Examples 1 to 3 of the present invention, the joining method used to join the first member and the second member was laser welding, and the sheet thickness of the second member 6 was changed for each of the Inventive Examples. In the Inventive Examples 4 to 6 of the present invention, the joining method used to join the first member and the second member was spot welding, and the sheet thickness of the second member 6 was changed for each of the Inventive Examples.

In the Inventive Examples 7 to 9 of the present invention, the front pillar outer 1 illustrated in FIG. 9 was used as the analytical model. The sheet thickness of the second member 6 was changed for each of the Inventive Examples 7 to 9 of the present invention.

In the Inventive Examples 10 to 12 of the present invention, the front pillar outer 1 illustrated in FIG. 10 was used as the analytical model. The sheet thickness of the second member 6 was changed for each of the Inventive Examples 10 to 12 of the present invention.

In the Inventive Examples 13 to 15 of the present invention, the front pillar outer 1 illustrated in FIG. 3 was used as the analytical model, similarly to Example 1. In the Inventive Examples 13 to 15 of the present invention, the joining method used to join the first member and the second member was laser welding and adhesive. The adhesive was assumed to be epoxy resin adhesive. The sheet thickness of the second member 6 was changed for each of the Inventive Examples 13 to 15 of the present invention.

The same model as in the Comparative Example of Example 1 was used as the model for the Comparative Example in Example 2.

In the Inventive Examples 1 to 15 of the present invention and the Comparative Example, the occurrence positions and magnitudes of bending moments M1 and M2 were the same as in Example 1, and the position at which the displacement D was applied was also the same as in Example 1. In Example 2, the displacement D was varied in increments of 0.1 mm from 0 to 3.0 (mm). In the Inventive Examples 1 to 15 of the present invention and the Comparative Example, although the sheet thicknesses of the second member and the joining methods differed, respectively, the external dimensions of the respective front pillar outers that were adopted as the analytical models were the same.

[Results]

Figure 7:
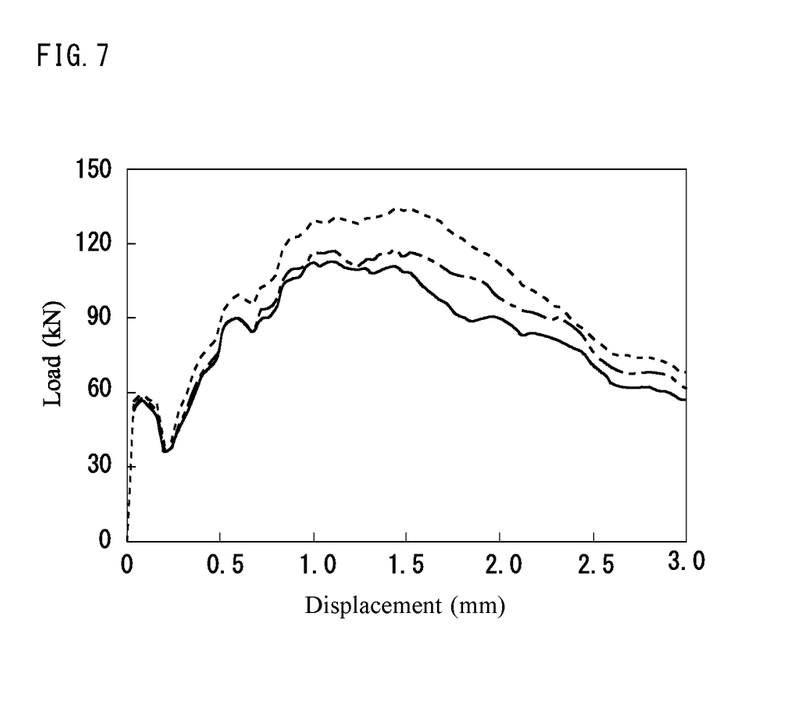
FIG. 7 shows a load-displacement graph obtained based on results of Example 2.

FIG. 7 is a load-displacement graph obtained based on the results of Example 2. Referring to FIG. 7, the ordinate represents a load (kN) generated by the displacement D, and the abscissa represents the displacement D (mm). In FIG. 7, the results of the Inventive Example 1 of the present invention, the Inventive Example 2 of the present invention and the Comparative Example are shown. In FIG. 7, an alternate long and short dash line represents the result of the Inventive Example 1 of the present invention, a broken line represents the result of the Inventive Example 2 of the present invention, and a solid line represents the result of the Comparative Example.

In each of the Inventive Examples 1 and 2 of the present invention, a maximum load (buckling load) generated by the displacement D was higher than in the Comparative Example. In other words, the strength of the front pillar outer of each of the Inventive Examples 1 and 2 of the present invention was higher than the strength of the front pillar outer of the Comparative Example.

The maximum load of the front pillar outer of each of the Inventive Examples 3 to 15 of the present invention was also higher than the maximum load of the front pillar outer of the Comparative Example, as shown in Table 2. In other words, the strength of the front pillar outer of each of the Inventive Examples 3 to 15 of the present invention was higher than the strength of the front pillar outer of the Comparative Example.

Figure 8:
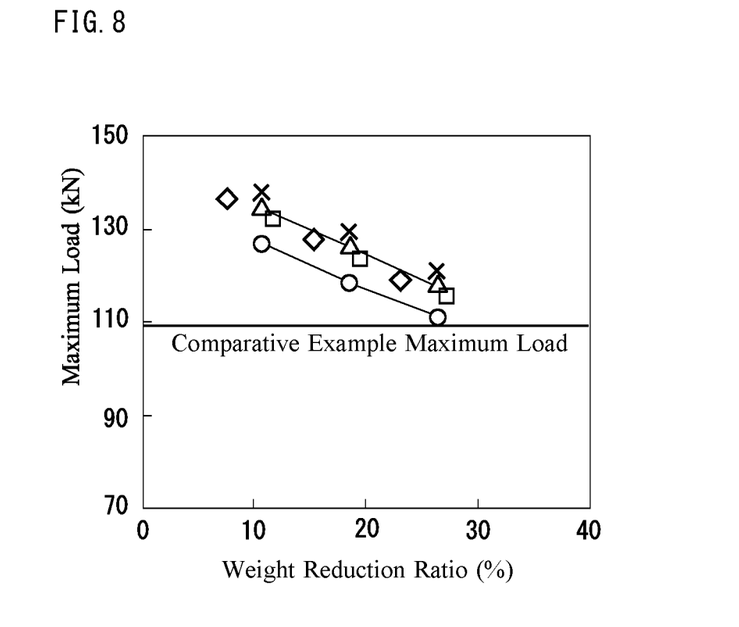
FIG. 8 is a maximum load-weight reduction ratio graph obtained based on results of Example 2.

FIG. 8 is a maximum load-weight reduction ratio graph that was obtained based on the results of Example 2. In other words, FIG. 8 is a diagram in which the maximum load column and the weight reduction ratio column in Table 2 are summarized as a graph. Referring to FIG. 8, the ordinate represents the maximum load, and the abscissa represents the weight reduction ratio. In FIG. 8, triangular marks represent results of the Inventive Examples 1 to 3 of the present invention, circular marks represent results of the Inventive Examples 4 to 6 of the present invention, square marks represent results of the Inventive Examples 7 to 9 of the present invention, diamond-shaped marks represent results of the Inventive Examples 10 to 12 of the present invention, and cross marks represent results of the Inventive Examples 13 to 15 of the present invention. In this case, the term "maximum load" means the buckling load for the respective front pillar outers. The weight reduction ratio was calculated as described below.

Figure 11:
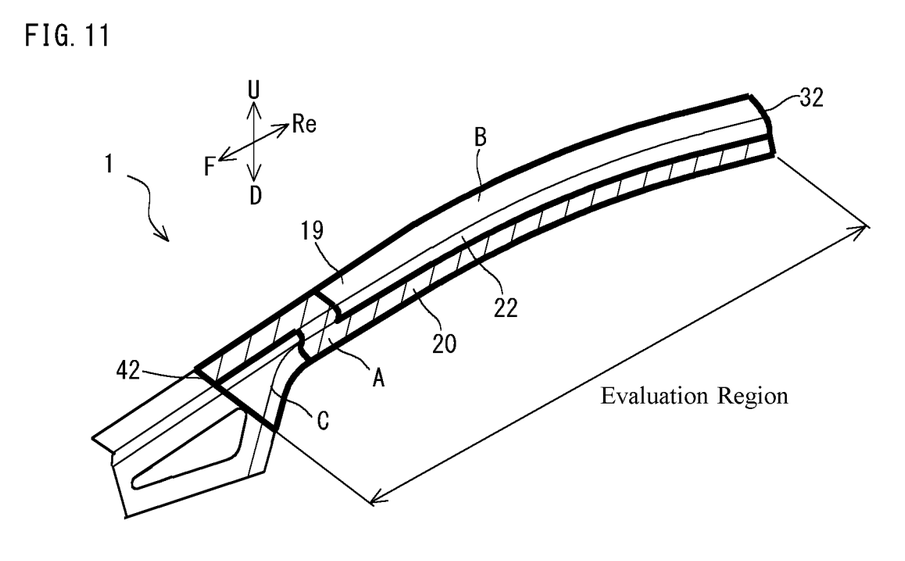
FIG. 11 is a view for describing a method for calculating a weight reduction ratio in Example 2.

First, a premise with regard to calculation of the weight reduction ratio will be described using FIG. 11. The weight reduction ratio was calculated with respect to an evaluation region that is illustrated in FIG. 11. A region from the fore end of the second member 6 (fore end 42 of the second glass-surface-side flange part) to the rear end 32 of the front pillar outer 1 was adopted as the evaluation region.

An area A illustrated in FIG. 11 represents the area of the first strength region. An area B represents the area of the second strength region. An area C represents the area of the third strength region. In this case, the term "area" means the surface area of the front face or rear face of the front pillar outer.

The area ratio of the area A, the area ratio of the area B and the area ratio of the area C with respect to the total area of the evaluation region are taken as "a", "b", and "c", respectively. The sheet thickness of the first member 5 is taken as "t1", and the sheet thickness of the second member 6 is taken as "t2".

Next, the method for calculating the weight reduction ratio will be described. First, when the sheet thickness of the front pillar outer of the Comparative Example (that is, the front pillar outer constituted by a single member) is taken as a sheet thickness that is $\alpha(>1)$ times thicker than t1, the weight reduction ratio is given by the following equation.

Weight reduction ratio (%)=(Comparative Example−Inventive Example of present invention)/Comparative Example=100×($\alpha$×t1×1−(t2×b+(t1+t2)×a+t1×c))/($\alpha$×t1×1)

Where, since a+b+c=1 (provided, 0<a<1, 0<b<1, 0<c<1), based on the above equation, the weight reduction ratio (%) is given by the following equation.

Weight reduction ratio (%)=100×(c−(t2/t1)×(1−b))

There is also a method for calculating the weight reduction ratio by adopting as the Comparative Example a front pillar outer constituted by a single member for which the maximum load is the same as in each of the Inventive Examples and determining $\alpha$ based on the sheet thickness thereof. However, here, the weight reduction ratio was calculated simply and easily by taking $\alpha$ as equal to 1, that is, taking the sheet thickness of the Comparative Example to be the same as t1 that represents the sheet thickness of the first member 5.

The front pillar outer of each of the Inventive Examples 2 to 15 of the present invention was lighter in weight and higher in strength than the front pillar outer of the Comparative Example. On the other hand, in the case of the front pillar outer of the Inventive Example 1 of the present invention, although the strength was equal to the strength of the front pillar outer of the Comparative Example, a reduction in weight could be adequately achieved.

An embodiment of the present invention has been described above. However, the foregoing embodiment is merely an example for implementing the present invention. Accordingly, the present invention is not limited to the above embodiment, and the above embodiment can be appropriately modified within a range which does not deviate from the gist of the present invention.

In the foregoing description, a case is described in which, when a collision load is applied to the front pillar outer, compressive stress is applied to both the door-side flange part and the glass-surface-side flange part. However, depending on the shape of the front pillar outer, there are also cases in which compressive stress is applied only to the door-side flange part.

In the foregoing description, a case is described in which the second member is superimposed on the first member. However, the first member may be superimposed on the second member.

In the foregoing description, a case was described in which, at a cross-section of the front pillar outer, the first strength region and the second strength region form a pair that sandwich the main body part. However, the front pillar outer of the present embodiment is not limited to this case. For example, in a case where the first strength region is provided in the door-side flange part, a first strength region may be further provided on the opposite side to the aforementioned first strength region so as to sandwich the main body part therebetween. In short, it suffices that the second strength region is provided in at least one part of a region where compressive stress is not applied.

In the foregoing description, a case was described in which the first member is joined to the second member by laser welding or spot welding. However, joining of the first member and the second member is not limited to this case. Joining of the first member and the second member may be performed using laser welding, spot welding, an adhesive, mechanical fastening using a rivet or the like, or a combination of these methods or the like. The adhesive is, for example, an epoxy resin adhesive, a phenol resin adhesive, a silicone rubber adhesive or the like. In short, a method for joining the first member and the second member is not particularly limited.

In the foregoing description, a case was described in which the material of the front pillar outer is a steel sheet. However, the material of the front pillar outer is not limited to this case. It suffices that the material of the front pillar outer is a metal sheet. The metal sheet is, for example, an aluminum sheet, an aluminum alloy sheet, a multi-layered steel sheet, a titanium sheet or a magnesium sheet.

REFERENCE SIGNS LIST

1: Front pillar outer
2: Side panel
3: Front pillar inner
4: Front pillar
5: First member
6: Second member
7: First glass-surface-side flange part
8: First door-side flange part
9: First main body part
10: Windshield glass
11: Door
12: Second glass-surface-side flange part
13: Second door-side flange part
14: Second main body part
15: Rearward region of first glass-surface-side flange part
16: Rearward region of first main body part
17: Roof
19: Glass-surface-side flange part
20: Door-side flange part
21: Rear end of glass-surface-side flange part
22: Main body part
31: Fore end of front pillar outer
32: Rear end of front pillar outer

The invention claimed is:

1. A front pillar outer that includes a glass-surface-side flange part, a door-side flange part, and a main body part that connects the glass-surface-side flange part and the door-side flange part, the front pillar outer comprising:
a first member extending from a fore end towards a rear end of the front pillar outer, the first member including a first glass-surface-side flange part constituting one part of the glass- surface-side flange part, a first door-side flange part constituting one part of the door-side flange part, and a first main body part that connects the first glass-surface-side flange part and the first door-side flange part;
a second member extending from the rear end towards the fore end of the front pillar outer and having a thinner sheet thickness than the first member, the second member including a second glass-surface-side flange part constituting one part of the glass-surface-side flange part, a second door-side flange part constituting one part of the door-side flange part, and a second main body part that connects the second glass-surface-side flange part and the second door-side flange part,
wherein:
the first door-side flange part protrudes further towards the rear end of the front pillar outer than the first glass-surface-side flange part and the first main body part, and overlaps with the second door-side flange part,
the second glass-surface-side flange part overlaps with a rearward region of the first glass-surface-side flange part,
the second main body part overlaps with a rearward region of the first main body part, and
the first member is joined to the second member in a region in which the first door-side flange part overlaps with the second door-side flange part, a region in which the second glass-surface-side flange part overlaps with the first glass-surface-side flange part, and a region in which the second main body part overlaps with the first main body part.

2. The front pillar outer according to claim 1, wherein:
when a length of the glass-surface-side flange part of the front pillar outer is represented by "L",
a region where the first door-side flange part overlaps with the second door-side flange part is provided in at least one part of a range of L×⅔ from a position corresponding to a rear end of the glass-surface-side flange part in the door-side flange part.

3. The front pillar outer according to claim 1, wherein:
when a length of the glass-surface-side flange part of the front pillar outer is represented by "L",
a region where the first door-side flange part overlaps with the second door-side flange part is provided over all of a range of L×⅔ from a position corresponding to a rear end of the glass-surface-side flange part in the door-side flange part.

4. The front pillar outer according to claim 1, wherein:

when a length of the glass-surface-side flange part of the front pillar outer is represented by "L", a region where the second glass-surface-side flange part overlaps with the first glass-surface-side flange part is provided in at least one part of a range between L×¼ and L×⅔ from a fore end of the glass-surface-side flange part.

5. The front pillar outer according to claim 1, wherein:

when a length of the glass-surface-side flange part of the front pillar outer is represented by "L", a region where the second glass-surface-side flange part overlaps with the first glass-surface-side flange part is provided over all of a range between L×¼ and L×⅔ from a fore end of the glass-surface-side flange part.

6. The front pillar outer according to claim 1, wherein:

a sheet thickness of the second member is 0.60 mm or more and 1.60 mm or less.

7. The front pillar outer according to claim 1, wherein:

a tensile strength of the first member and the second member is 800 MPa or more.

8. The front pillar outer according to claim 1, wherein:

a tensile strength of the second member is higher than the tensile strength of the first member.

9. The front pillar outer according to claim 1, wherein:

the first member is joined to the second member by laser welding, spot welding, mechanical fastening, an adhesive or by using a combination of these joining methods.

* * * * *